Jan. 19, 1960 R. L. HACKMAN ET AL 2,922,023
ELECTRIC ARC PROCESS AND APPARATUS
Filed Dec. 17, 1956
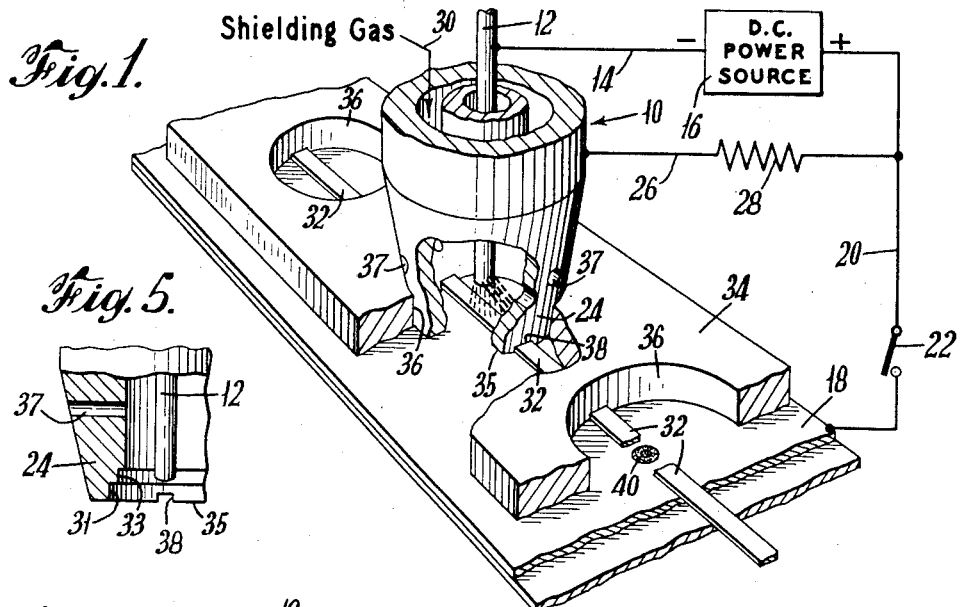
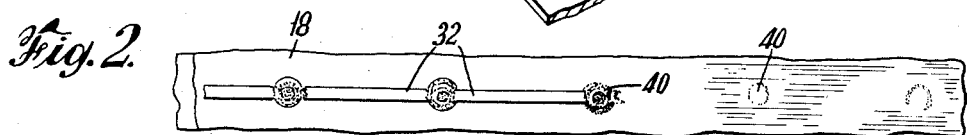
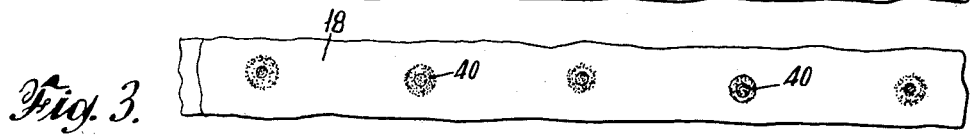
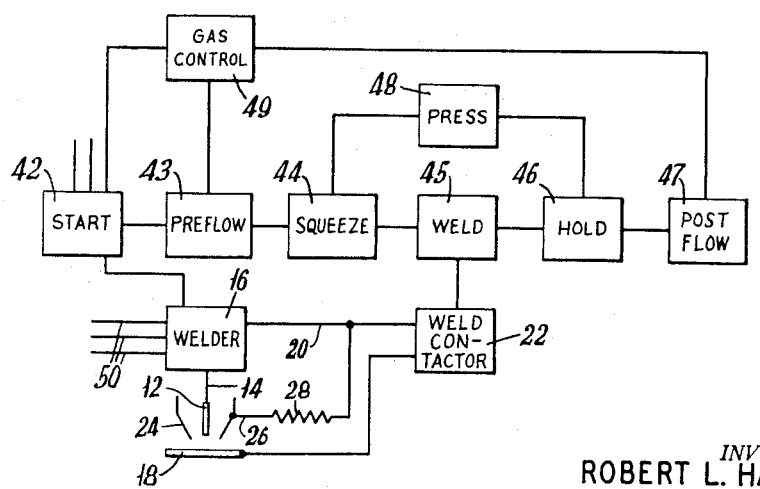
INVENTORS
ROBERT L. HACKMAN
RAYMOND P. SULLIVAN
BY Barnwell R. King
ATTORNEY

United States Patent Office 2,922,023
Patented Jan. 19, 1960

2,922,023

ELECTRIC ARC PROCESS AND APPARATUS

Robert L. Hackman, Morris Plains, and Raymond P. Sullivan, Jersey City, N.J., assignors to Union Carbide Corporation, a corporation of New York Application December 17, 1956, Serial No. 628,660

16 Claims. (Cl. 219—74)

This invention relates to electric arcs and more particularly to the use of a pilot high-pressure arc for starting and aiding a gas shielded arc working operation.

In its simplest form, according to the invention, there is provided a novel process which comprises igniting a pilot high-pressure arc between spaced electrodes, applying such pilot arc to a workpiece that is electrically neutral with respect to such arc, and electrically transferring such pilot arc to the workpiece by applying substantially the same relative potential of one of said electrodes to such workpiece.

More particularly the invention comprises feeding inert gas to an arc spot welding torch including a central electrode surrounded in spaced concentric relation by an electrically "hot" nozzle from which such gas is discharged, and striking a pilot high-pressure arc between such electrode and said nozzle, the effluent of which arc is discharged with such gas from such nozzle. Such discharged pilot arc effluent is applied to electrically conductive work that is electrically neutral with respect to such pilot arc effluent, and the nozzle is moved into direct contact with such work, causing such pilot arc to transfer electrically from the nozzle to the work as an electrode. Such work is melted in the area within such nozzle by increasing the current of such arc in circuit with said work to produce a spot weld therein when the operation is finished.

Where pilot arc starting has been used in the past it has been generally understood that the gas cup or nozzle, when it is an electrode for such pilot arc, should be electrically insulated from the work at least by an air gap. We have discovered, however, that this is not necessary. Thus, a so-called electrically "hot" pilot arc cup need not be insulated from the work and, in fact, can be deliberately brought into actual physical or electrical contact with the work without extinction of the pilot arc or any other detrimental effect. Also, in welding, according to the invention, such pilot arc serves the unexpectedly useful purposes of preheating and postheating.

The invention solves a problem involving the spot-welding together of three sheets of thin stainless steel, for example, in which the maximum indentation or cratering permissible is 0.003 in. since the top sheet is the air foil surface of a supersonic aircraft. Naturally, high and consistent shear strengths are demanded of such spot-welds. It has been found that unless a backup is used which would greatly complicate manufacture, it is necessary to allow the weld underbead to project approximately 0.010 in. below the bottom sheet. Such degree of penetration has been found requisite to high shear strength. However, such degree of penetration results in the undesirable effect of more than 0.003 in. crater or sink in the top of the weld. Faced with these results, our solution also involves the addition of filler metal to make up the loss from weld sink.

Alternate methods of metal addition involve placing the metal in position over the point to be welded before the torch is positioned. Again there are two distinct choices: (1) finely-divided metal or (2) metal with a finite form. The first choice has been rejected by us for practical purposes. Finely-divided metal will tend to be disbursed by the shielding gas unless the metal is held in place with a binder. The second choice can, of course, take many forms such as:

(1) Small discs of metal which can be completely fused into the weld.

(2) A waster sheet placed on top of the weldment from which sheet metal is fused downward into the weldment and the excess sheet is later removed.

(3) Bars of metal having very small cross section.

(4) Thin strips of metal, which is a combination of Methods 2 and 3.

All four of the above methods have been tried and found to work by us; however, some are more practical than others. Method 1 requires exact positioning; Method 2 involves considerable metal waste in the unused areas of the waster sheet and some difficulty may be encountered in peeling off the sheet; and Methods 3 and 4 involve less metal loss and positioning is easily accomplished by positioning slots in the bottom of the gas cup or an insulated positioner template. The unfused metal remaining on the weldment from Methods 3 and 4 is easily removed.

Method 4 of metal addition described above has solved the problem best for this particular welding application. However, all four methods of metal addition can be utilized with our novel pilot arc method of starting for both arc spot- and seam-welding.

Pilot high-pressure arc starting, in which the gas nozzle or cup is an electrode of the pilot arc, is superior to high-frequency pilot arc starting for several reasons. With pilot high-pressure arc starting there is no high-frequency radiation, there is a greater degree of starting reliability, and torch design complications are reduced because it is not necessary to design against internal high frequency leakage or arc-over. Opposed to the disadvantages of high-frequency pilot arc starting, pilot high-pressure arc starting, particularly according to the present invention, includes the desirable possibility of preheating and postheating. In addition we have discovered that the postheating cycle by the pilot high-pressure arc effluent as a rule, completely melts the waster strip free of each weld button. This cannot be accomplished when using high frequency pilot arc for starting.

In the drawings:

Fig. 1 is a fragmentary perspective view, with parts broken away and shown in section, of an inert gas-shielded refractory electrode arc spot-welding set-up illustrating the invention;

Figs. 2 and 3 are fragmentary top and bottom plan views of work spot-welded with the set-up of Fig. 1;

Fig. 4 is a circuit diagram of the invention; and Fig. 5 is a fragmentary view in section of a preferred form of our electrically "hot" cup.

An inert gas-shielded arc torch 10, such as that shown by Kane and Pilia in their patent application Serial No. 560,117, filed January 19, 1956, now Patent No. 2,863,-983, which is owned by the assignee of the present case, is provided with a stick-type thoriated-tungsten electrode 12 that is connected by a conductor 14 to the negative (−) side of a direct current power source 16. The positive (+) side of such source is connected to the work 18 through a conductor 20 provided with a switch 22; and to a gas nozzle or cup 24 composed of metal through a conductor 26 containing a resistor 28. Inert shielding gas 30 such as argon is delivered to the cup 24 and flows outwardly therefrom in an annular stream about the arc end of the electrode 12 and over the adjacent areas of the work 18.

In spot-welding applications wherein the cup is touched to the work for the purpose of exerting pressure on the workpieces to be spot-welded, we have found it desirable, as shown in Fig. 5, to provide counterbores or countersinks, 31, 33, on the inner diameter of the end face of the cup 24. Repeated arcing between the electrode 12 and the cup 24 may result in some erosion of the inner surface of the cup at the end face. The counterbores cause the pilot arc to arc from the electrode to a point in the cup removed from the end face. Thus, a flat surface 35 is maintained on the annular end face of the cup for the presentation of a pressing force on the workpiece equally distributed about the end face of the cup.

The wall of the cup is also provided with lateral gas outlet ports or vents 37, for the escape of gas when the end of the cup is brought into actual physical and electrical contact with the work in the manner set forth below.

A step-by-step description of the operation, Fig. 1, is as follows: A waster strip 32 is positioned over the centerline of the intended spot-welds. An insulator-positioning template 34 is then centered over the waster strip 32 and secured in place. With a pilot high-pressure arc arcing between the electrode 12 and the cup 24 the torch 10 is brought down so that the cup fits in a hole 36 in the template 34 so that notches 38 in the rim of the cup receive the waster strip 32. The notches 38 are located in the cup 24 so that the remaining rim of the cup will rest squarely and uniformly on the surface of the work 18.

As the torch 10 approaches the work 18, which is electrically neutral, the pilot arc will continue to arc between the electrode 12 and the cup 24 until the cup touches the work, at which time, since the electrode-to-waster strip distance is less than the electrode-to-cup distance and since the cup by virtue of coming in contact with the work places it at the same electrical potential as the cup, the pilot arc jumps directly to the work as an electrode. When the switch 22 is closed to increase the welding current, the welding arc follows the same path as the pilot arc, melting the work under the arc, and the waster strip is melted into the weld puddle.

When the weld cycle is completed and a timing device opens switch 22, the weld is completed, but the pilot arc continues to arc between a completed spot-weld button 40 and the torch electrode 12. At such time the heat supplied by the pilot arc generally results in the complete separation of the waster strip 32 from the weld button. As the torch 10 is lifted from the work 18 the pilot arc jumps back to the cup 24, as an electrode, since the work 18 no longer has any electrical connection in the welding circuit. Thus, it can be seen, that placing the metallic gas cup 24 directly against the work 18 acts as a switch to bring the work to the same electrical potential as the cup and thus produces an alternative arcing point for the pilot arc. The D.C. power source 16 is a conventional D.C. welding power source, while the resistor 28 serves to limit the pilot arc current.

Pilot high-pressure arc starting according to the invention offers a number of additional advantages over high-frequency starting for both inert gas-shielded arc spot and seam welding. They are as follows:

(1) By virtue of the presence of the pilot high-pressure arc the electrode is maintained at a constant temperature and a constant dimension, resulting in more uniform spot welds and, in the case of mechanized applications where voltage control is not used, there is far less danger of electrode growth, resulting from heating, causing a shortening of the arc length as the weld progresses.

(2) There is no electrical shock hazard connected with use of pilot high-pressure arc starting as opposed to the high potential presented by high-frequency current.

(3) There is no practical limitation in a torch cable length when using pilot high-pressure arc starting. When high-frequency starting is used, the limits of the torch cable are determined by the capacitive attenuation of the high frequency per unit length of cable. In other words, if the cable has sufficient length, no high frequency will arrive at the torch end.

(4) Although not applying to spot-welding but only to straight inert gas-shielded arc applications, metal cups can be used in all applications. When using high frequency, ceramic cups are required in certain manual welding applications.

The form of pilot arc starting which is preferred by us is, therefore, a pilot high-pressure arc between electrode and cup.

Figs. 2 and 3 show a series of spot-welds which have been prepared according to the invention. It will be noted in Fig. 2, showing a portion of the waster strip 32 removed and the weld buttons 40 ground flush, that some slight undercutting or sink is still visible. The picture is somewhat deceiving in this respect for examination of the actual weld sample shows that the irregularities in the surface of the metal about the weld nuggets are so slight that they can be barely detected when rubbing the finger over the ground surface of the weldment. It should also be noted that this picture was prepared before the discovery that the post pilot arc heat was sufficient, in most cases, to completely melt the waster strip free from the weld button. In most cases, even without pilot post heat, there is very little metal joining the waster strip to the weld button.

The automatic spot welding control, as shown in Fig. 4 consists basically of a starting circuit 42, five timing circuits 43–47, a gas control circuit 49, and press mechanism 48. The starting circuit 42 is arranged so that in setting up the operation, the starting circuit 42 energizes a primary contactor of a D.C. power source or welder circuit 16, power being supplied by mains 50 connected directly to the welder circuit 16. Simultaneously the starting circuit 42 energizes the gas control circuit 49 so that at least 3 c.f.h. of shielding gas is provided for the pilot arc in the torch. The pilot arc is then struck between the ends of electrode 12 and cup 24. The welding control and associated apparatus are thus readied for the welding operation. The operation of the starting circuit 42 is initiated by operating a suitable switch and, in turn, causes the pre-flow timer 43 to start timing an increased flow of gas. The pre-flow timer 43 controls the amount of time the volume of gas required for welding is flowing prior to the start of the welding action.

The squeeze timer 44, which controls the press mechanism 48, may start its squeeze simultaneously with the pre-flow timer 43, or may proceed, or follow it, in time sequence. When the squeeze timer 44, through its action on the press mechanism 48, has caused the gas cup 24 to be pressed against the work for a predetermined time, the squeeze timer 44 energizes the weld timer 45. In turn, the weld timer 45 closes the welding contactor switch 22, so that the welding circuit is completed and the welding arc is drawn on the workpiece 18.

At the completion of the welding cycle, the welding timer 45 de-energizes the welding contactor switch 22, causing it to open, and simultaneously energizes the hold timer 46. This timer, 46, controls the length of time that the gas cup is pressed against the work after the main welding action has been completed. When the hold timer 46 is timed out, it actuates the press mechanism 48 so that the gas cup is withdrawn from the work.

The post-flow timer 47 may be actuated simultaneously with the hold timer, or at some later point in time. Upon completion of the post-flow timing cycle, the post-flow timer 47 actuates the gas control circuit 49 so that the gas flow is reduced from the amount required for welding to the amount required for maintenance of the pilot arc only.

In some cases the welding cycles may follow after each other in such rapid succession that there is little economic advantage in attempting to reduce the gas flow during the non-welding portion of the overall cycle. In these cases the pre-flow and post-flow timers may be eliminated.

The following is a brief recapitulation of the operation of the automatic spot welding control shown in Fig. 4:

The starting circuit 42 energizes the primary contactor switch 22 and actuates the gas control 49 so that at least 3 c.f.h. of argon is flowing through the torch. The pilot arc is then struck. The sequence is then started with a pre-flow of gas controlled by the pre-flow timer 43. This timer actuates the gas control 49 so as to increase the shielding gas flow to a rate suitable for the main welding action. Simultaneously, the squeeze timer 44 is actuated and, in turn, operates the press mechanism 48 to press the torch gas cup 24 against the workpiece 18.

At the end of the squeeze time, the weld timer 45 is started and, in turn, actuates the weld contactor 22 switch closing the main welding circuit. Upon completion of the welding cycle, contactor switch 22 opens and the hold timer 46 maintains a post-welding pressure against the workpiece 18 and then actuates the press mechanism 48 to release the gas cup pressure on the work 18. The post-flow timer 47 is actuated; and upon completion of the time cycle, actuates the gas control 49 so as to reduce the gas flow to the idling gas flow required for the pilot arc.

As an example of an actual automatic welding operation according to the invention in which a waster strip is not used, the following conditions are representative:

*Table I*

| | |
|---|---|
| Main arc current | 160 A. DC–SP. |
| Time | 110 cycles (1 cycle=1/60 sec.). |
| Length | 0.072 in. |
| Voltage | 70–80 volts (open circuit). |
| Pilot arc current | 10 A. DC–SP. |
| Time | Operating constantly. |
| Gas—kind | Argon (commercial grade). |
| Pilot arc flow | 3 cu./ft./hr. |
| Welding flow | 5–6 cu./ft./hr. Pre-flow time 10 cycles. Post-flow time 10 cycles. |
| Electrode | 1/8 in. D.[1]-thoriated tungsten. Tip pointed. |
| Nozzle #6 | 3/8 in. I.D.-copper. |
| Work—Metal | 2 carbon steel sheets, 1–0.044 in. thick, 1–0.063 in. thick. |

[1] Diameter.

An actual manual spot welding example of the invention is typified by the conditions set forth in the following:

*Table II*

| | |
|---|---|
| Waster strip | 0.025 in. thick, 1/16 to 3/32 in. wide, 17–7 PH stainless. |
| Electrode | 1/8 in. D.[1]-tungsten (thoriated). Tip pointed. |
| Main arc current | 150 A. DC–SP. |
| Gap | 0.060 in. |
| Time | 1.0 sec. |
| Gas cup: | |
| Contact time | 2 sec. (approx.) |
| Nozzle #6 | 3/8 in. I.D.-copper. |
| Gas: Flow | Argon, 10 c.f.h. (constant). |
| Pilot arc | 10 A. DC–SP. Continuous operation. |
| Work—metal | 3 sheets stainless. Top 0.042 in. thick. Middle 0.035 in. thick. Bottom 0.025 in. thick. |

[1] Diameter.

The term "high-pressure" arc as used herein is discussed (pages 290 and 326) by Cobine in his book, "Gaseous Conductors," published in 1941 by McGraw-Hill and is to be understood to relate to self-sustaining gas discharges in the general pressure range of 1/20 to several atmospheres and generally in the current range of a few to many of amperes.

What is claimed is:

1. Process which comprises igniting a pilot high-pressure arc between spaced electrodes, applying such pilot arc to a workpiece that is electrically neutral with respect to such arc, and electrically transferring such pilot arc to the workpiece by applying substantially the same relative potential of one of said electrodes to such workpiece.

2. Process which comprises igniting a pilot high-pressure arc between spaced electrodes, applying such pilot arc to a workpiece that is electrically neutral with respect to such arc, and electrically transferring such pilot arc to the workpiece by applying substantially the same relative potential of one of said electrodes to such workpiece and electrically energizing a transferred power high-pressure arc between such workpiece and the other electrode.

3. Process as defined by claim 2, in which such power arc is discontinued while the transferred pilot arc is continued until the workpiece is again made electrically neutral causing the pilot arc to return to such spaced electrodes and become electrically non-transferred with respect to the workpiece.

4. Process which comprises feeding gas to an arc torch including a central electrode surrounded in spaced concentric relation by an electrically conductive nozzle from which such gas is discharged, striking a high-pressure arc between such electrode and said nozzle, the effluent of which arc is discharged with such gas from such nozzle, applying such discharged arc effluent to an electrically conductive member that is electrically neutral with respect to such arc effluent, and switching said nozzle and such member into the same polarity with respect to each other, causing such arc to transfer from the nozzle to the member as an electrode.

5. Process which comprises feeding gas to an arc torch including a central electrode surrounded in spaced concentric relation by an electrically conductive nozzle from which such gas is discharged, striking a high-pressure arc between such electrode and said nozzle, the effluent of which arc is discharged with such gas from such nozzle, applying such discharged arc effluent to an electrically conductive member that is electrically neutral with respect to such arc effluent, and moving said nozzle into direct contact with such member, causing such arc to transfer electrically from the nozzle to the member.

6. Process which comprises feeding gas to an arc spot welding torch including a central electrode surrounded in spaced concentric relation by an electrically conductive nozzle from which such gas is discharged, striking a pilot high-pressure arc between such electrode and said nozzle, the effluent of which arc is discharged with such gas from such nozzle, applying such discharged pilot arc effluent to an electrically conductive member that is electrically neutral with respect to such pilot arc effluent, and moving said nozzle into direct contact with such member, causing such pilot arc to transfer electrically from the nozzle to the member as an electrode, melting such member in the area within such nozzle to produce a spot weld when the operation is finished.

7. Process as defined by claim 6, in which a strip of waster metal is disposed between said nozzle and said electrically conductive member for the purpose of supplying additional metal to the spot weld, and making a well-defined circular line of demarcation between such spot weld and the remainder of such strip by continuing the transferred pilot arc for a predetermined time interval after the main arc has been discontinued.

8. Process of spot-welding overlapping sheets of metal with a refractory electrode inert gas-shielded arc torch which comprises laying a strip of waster metal on the top of such sheets to be spot-welded, connecting the electrode and cup of such torch to a direct current source, striking a direct current pilot arc between such cup and electrode while discharging inert gas from the cup, applying the rim of said cup to said strip with the result that the pilot arc current is transferred to such strip, connecting said sheets and electrode to a source of welding current and thereby striking a main arc between the end of such electrode and such sheets, fusing the metal thereof adjacent such arc, whereupon the operation is stopped, leaving the sheets spot-welded together.

9. Electric arc spot welding process which comprises applying a metal member on a workpiece in the area to be welded, and drawing a welding arc between an electrode and such workpiece, melting such member in such area to thereby add metal to the spot weld puddle, while supplying an annular stream of inert gas such as argon thereto, with the result that no sink is left in the weld when the operation is finished in which the metal member is a strip that is pressed by the rim of a nozzle for such gas into direct contact with the workpiece, and the current of such arc is reduced to a predetermined value for a predetermined time interval for the purpose of melting the metal of the strip entirely from the latter only in the area of the weld so that the remainder of such strip can be removed from the workpiece after the operation.

10. Process as defined by claim 9 in which such reduced current is conducted to the strip and workpiece through said nozzle.

11. Electric arc welding apparatus comprising, in combination, an electrode consisting of gas nozzle having an inner annular surface, and another electrode depending centrally within said nozzle, providing an annular gas passage therebetween, means supporting said nozzle and electrode electrically insulated from each other, characterized in that such inner surface of the nozzle is provided with at least one annular step the diameter of which is less than that of the end surface of the nozzle, for carrying an arc between the nozzle and said central electrode.

12. Electric arc welding apparatus comprising, in combination, an electrode consisting of gas nozzle having an inner annular surface, and another electrode depending centrally within said nozzle, providing an annular gas passage therebetween, means supporting said nozzle and electrode electrically insulated from each other, characterized in that said nozzle is provided with alined slots in the rim thereof for fitting a waster strip disposed on a work electrode for cooperation therewith, and said nozzle is also provided with at least one lateral vent for discharging gas delivered to said nozzle when the rim of the latter is pressed into contact with such work electrode.

13. Process as defined by claim 2, in which the so transferred pilot arc is applied to the workpiece for a predetermined interval of time for the purpose of pre-heating the workpiece before said power arc is so transferred.

14. Process as defined by claim 3, in which the so continued transferred pilot arc is so applied to the workpiece for a predetermined time interval for the purpose of post-heating the workpiece before the pilot arc is so returned to the spaced electrodes.

15. Process as defined by claim 14, in which the first so transferred pilot arc is applied to the workpiece for a predetermined interval of time for the purpose of pre-heating the workpiece before said power arc is so transferred.

16. Gas shielded non-consumable electrode electric arc spot welding process which comprises striking in an atmosphere of selected gas an electric spot welding arc between a non-consumable electrode and a sheet of metal overlapping a base metal member in circuit relation with such non-consumable electrode, melting a puddle of metal in such gas atmosphere with such arc in the adjacent portion of such sheet, adding filler metal to such puddle by melting a certain predetermined portion of a filler metal member in such arc adjacent such puddle, and discontinuing such arc, producting a spot weld between such sheet and said base metal member provided only with filler metal that is so fused to fill the weld indentation that otherwise would be left in such spot weld with such predetermined certain portion of said filler metal member.

References Cited in the file of this patent

UNITED STATES PATENTS

| | | |
|---|---|---|
| 1,085,769 | Thomson | Feb. 3, 1914 |
| 1,700,319 | Kjekstad | Jan. 29, 1929 |
| 2,281,335 | Somes | Apr. 28, 1942 |
| 2,308,510 | Herman | Jan. 19, 1943 |
| 2,360,160 | Pickhaver | Oct. 10, 1944 |
| 2,516,016 | Pakala | July 18, 1950 |
| 2,583,665 | Pilia | Jan. 29, 1952 |
| 2,703,835 | Douglas | Mar. 8, 1955 |
| 2,721,923 | Anderson | Oct. 25, 1955 |